L. JANES.
TRACTOR FOR FARM MACHINERY.
APPLICATION FILED JULY 3, 1916.
1,242,555.
Patented Oct. 9, 1917.
2 SHEETS—SHEET 2.
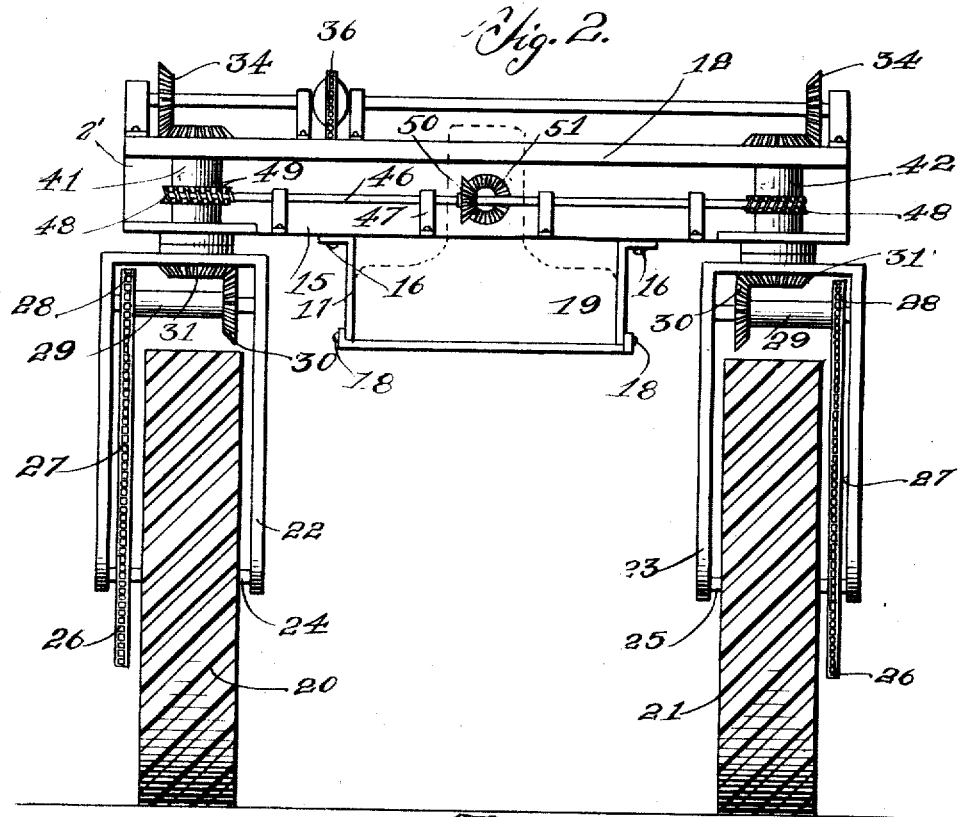
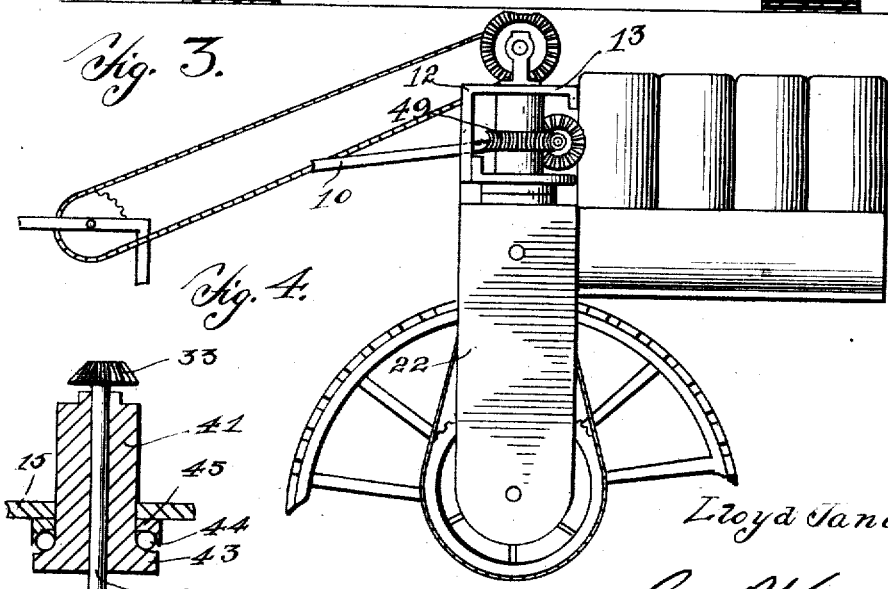
Lloyd Janes,
Inventor
By Geo. P. Kimmel.
Attorney

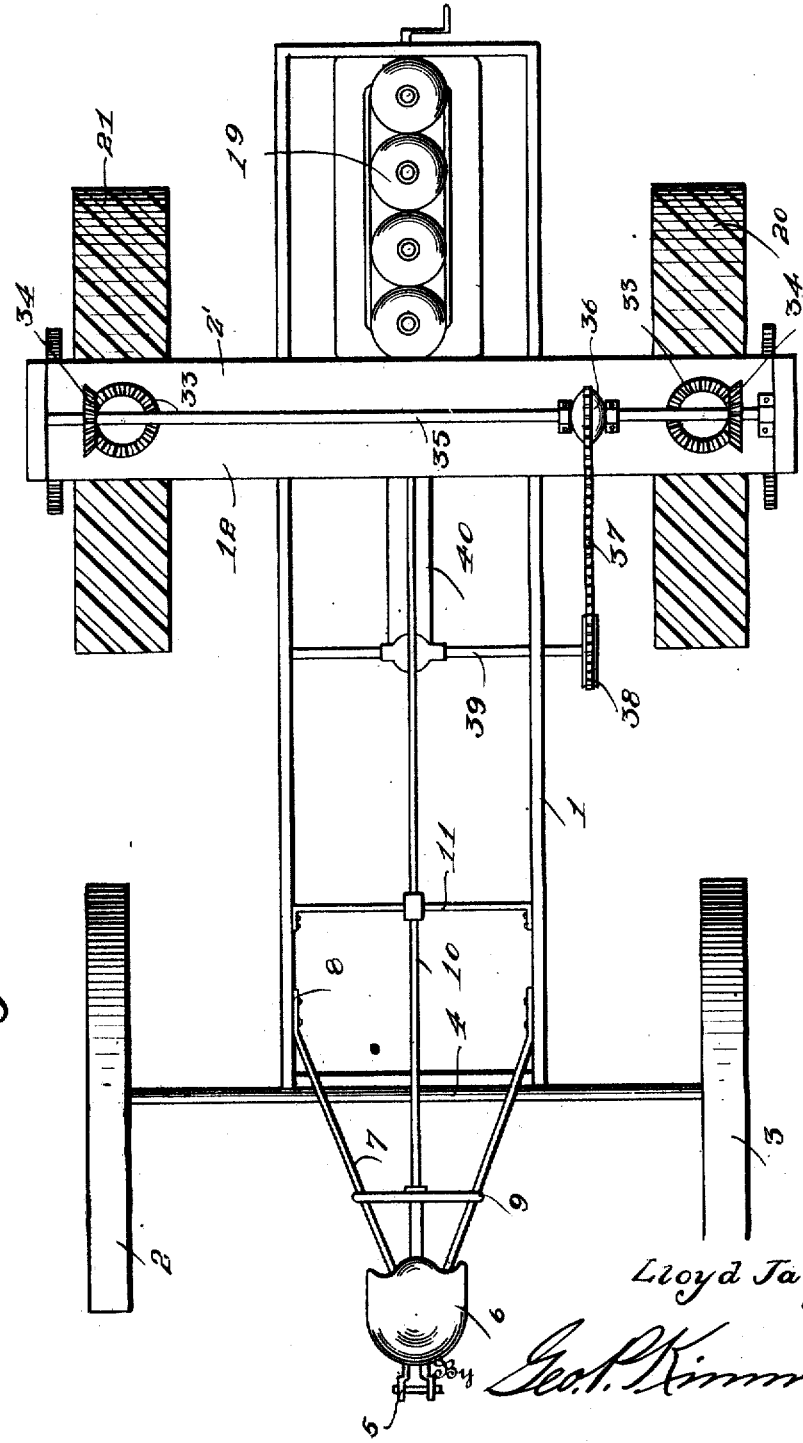

UNITED STATES PATENT OFFICE.

LLOYD JANES, OF CARLAND, MICHIGAN.

TRACTOR FOR FARM MACHINERY.

1,242,555.      Specification of Letters Patent.      Patented Oct. 9, 1917.

Application filed July 3, 1916. Serial No. 107,340.

*To all whom it may concern:*

Be it known that I, LLOYD JANES, a citizen of the United States, and resident of Carland, in the county of Shiawassee and State of Michigan, have invented certain new and useful Improvements in Tractors for Farm Machinery, of which the following is a specification.

The present invention relates to new and useful improvements in motor vehicles and has particular reference to a new and improved type of cultivator tractor, the primary object of my invention being to provide a tractor of the class described having a strong and durable construction, the principal feature of the device being the disposition of the power plant over or in alinement with the driving wheels of the vehicle.

Another object of my invention is to provide a tractor of the class described having a simple and compact structure combining durability and effectiveness in operation, the device operating on the principle of the driven-steering-wheel type, that is, the steering wheels of the vehicle are the driving wheels.

A further object of my invention is to provide a device of the class described, having means for supporting a power plant thereon.

Other objects and advantages to be derived from the use of my improved tractor will appear from the following detail description and the claims, taken with an inspection of the accompanying drawings, in which:—

Figure 1 is a top plan view of a tractor embodying the improvements of my invention;

Fig. 2 is front end elevational view of the same;

Fig. 3 is a fragmental side elevational view of the front end of the machine; and Fig. 4 is an enlarged detail vertical sectional view of the driving and guiding spindle of my invention.

Referring more particularly to the drawings, wherein similar characters of reference designate like and corresponding parts throughout the various views, 1 designates the chassis of my improved motor vehicle or tractor the same being provided with the usual rear wheels 2 and 3 mounted on an axle 4 rigidly connected with the frame or chassis 1. Any farm implement or machinery such as a cultivator, harrow or the like may be connected with the rear end of the frame 1, a draw bar 5 being provided for this purpose. A driver's seat 6 is mounted on divergent brace rods 7 connected at 8 with the side bars of the chassis 1. A steering wheel 9 is mounted on the rear end of a steering shaft 10 connecting with a steering mechanism hereinafter described. The shaft 10 is mounted in a suitable bracket 11. Of course, it will be understood that I do not lay any particular stress upon the construction and arrangement of the parts of my invention in so far as the rear portion of the machine is concerned, the conventional form of controlling levers and the like being employed.

My invention resides more specifically in the construction and arrangement of the forward end of the machine. The chassis 1 is connected rigidly with a carrying yoke or frame 12 having a top wall 13 and a vertical wall. The yoke 2' is provided with a bottom wall 15 to which are bolted, as at 16, hangers 17, which engage in the side portions of the chassis 1, bolts 18 connecting said hangers to said chassis. A power plant 19 is provided and is in the present instance a four-cylinder internal combustion engine, being of the type commonly employed in the class of work to which the machine is to be put.

The driving wheels are designated 20 and 21 and are mounted in U-shaped frames 22 and 23, respectively, shafts or axles 24 and 25 being provided in said frames. Relatively large sprocket wheels 26 are carried by the shafts 24 and 25 and receive power through the medium of sprocket chains 27 and sprockets 28, from a stub shaft 29 mounted at the upper end of the frame 22 and 23. Bevel gears 30 engaging similarly formed gears 31 are carried by the shaft 29. The gears 31 are mounted on the lower free end of vertically arranged shafts 32, said shafts having on the upper free ends thereof bevel gears 33 meshing with similarly formed gears 34 carried on the free ends of a jack-shaft 35. The shaft 35 receives power through a sprocket 36 of the differential type, said sprocket in turn receiving power through the medium of a chain 37 and sprocket 38 carried by a power receiving shaft 39 mounted on the frame 1. The shaft 39 receives power from the power plant 19 by any suitable gearing (not shown) contained in a housing 40.

The shafts 32 are freely rotatable in a pair of bearing trunnions 41 and 42 carried rigidly by the upper free ends of the frames 22 and 23. The lower free ends of the trunnions 41 and 42 are provided with bearing cones 43, balls 44 being mounted for movement thereon; and bearing cones 45 carried by the wall 15 serving to support the yoke 2' on said frames 22 and 23. In this manner power may be delivered to the driving wheels 20 and 21 regardless of their position angularly relative to the power plant. The steering gear of my invention includes in combination with the shaft 10 a second shaft 46 mounted in bearings 47 carried by the yoke 2', said shaft 46 having worms 48 carried by the free ends thereof, said worms 48 being in meshing engagement with worm gears 49 rigidly carried by the trunnions 41 and 42 movement is imparted to the shaft 46 from the shaft 10 by bevel gears 50 and 51.

From an inspection of Figs. 1 and 3 it will be apparent that the power plant is mounted slightly in advance of the driving wheels, thereby tending to center the greater part of the weight of the platform on said driving wheels, thereby materially increasing the tractive effort of the machine. It will also be readily apparent that owing to the peculiar mounting of the driving wheels the same may be turned practically at a right-angle facilitating negotiation of a sharp turn by the tractor. It will be noted that the power plant has been shown in dotted lines in Fig. 2 so as to facilitate showing the beveled gears 50 and 51. It will also be apparent that the relatively high mounting of the chassis and power plant prevents the latter from interfering with the free turning of the driving wheels. This materially assists in permitting the device to negotiate the sharp turns mentioned above, without materially changing the center of gravity of the machine. It will also be apparent that the operator may from the seat 6 control both the tractor and the farm machinery drawn thereby. It will be readily apparent that by the provision of suitable connecting means a gang plow, harrow, or cultivator or the like may be mounted between the rear wheels 2 and 3 of the device, or may be connected to the draw bar 5 as desired. The simplicity and durability of the structure of my improved tractor are its greatest advantages over the present type of tractors in use.

I do not desire to limit myself to the exact detail structure shown but lay particular stress upon the manner in which the yoke 2' serves to support the power plant, as well as the improved steering mechanism employed.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

1. A tractor of the class described, including a chassis, a yoke carried by the forward end thereof, swiveled frames carried by the free ends of said yoke, a power plant carried by the free front end of said chassis and mounted slightly in advance of the center line of said yoke, steering and driving wheels carried by said frames, steering means for said frames associated with the swivel connections, ball bearing means therefor, and means for driving said driving and steering wheels from said power plant associated with said yoke and said frames.

2. A tractor of the class described including a chassis, a yoke mounted transversely across the chassis adjacent its forward end, the sides of said yoke positioned horizontally with respect to the chassis, longitudinally extending driving and steering shafts carried by said frame above and between the sides thereof respectively, a power plant connected with said driving shaft and carried by the chassis, frames disposed beneath said yoke, driving and steering wheels carried by said frames, trunnions mounted vertically through the horizontal sides of the yoke and connected with the frames, means extending vertically through said trunnions for connection with the driving shaft and wheels, and means carried by said steering shaft and operatively connected with the walls of the trunnions for swinging the frames upon operation of the steering shaft.

3. The combination with a tractor of the class described including a yoke mounted transversely across the chassis with its sides positioned horizontally with respect to the same, longitudinally extending driving and steering shafts carried by said yoke, frames disposed beneath the yoke, driving and steering wheels carried by said frames, trunnions mounted through said yoke and connected with the frames, means extending vertically through said trunnions for connecting the drive shaft with said wheels, ball bearings for said trunnions, and worm gears on the steering shaft operatively connected with the walls of the trunnions whereby upon rotation of said shaft the frames will swing to steer the tractor.

In testimony whereof, I affix my signature hereto.

LLOYD JANES.